April 5, 1932.                J. ABEGGLEN                1,852,992
                           MECHANICAL MOVEMENT
                            Filed Dec. 4, 1929
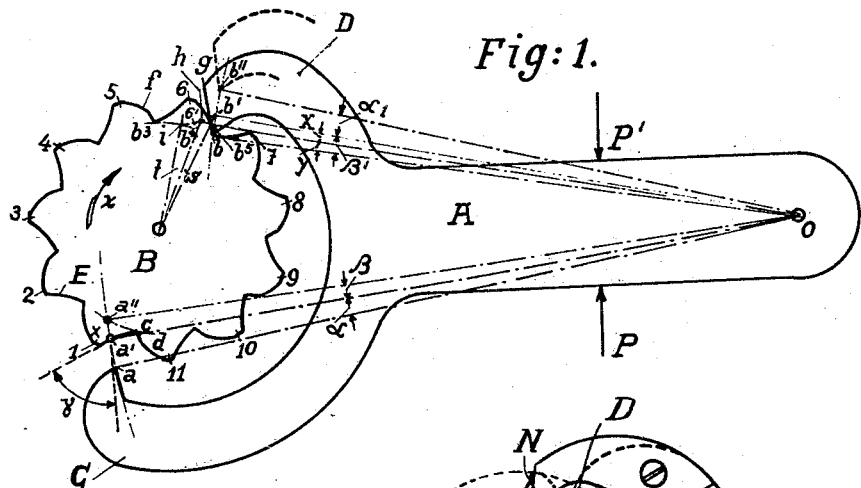
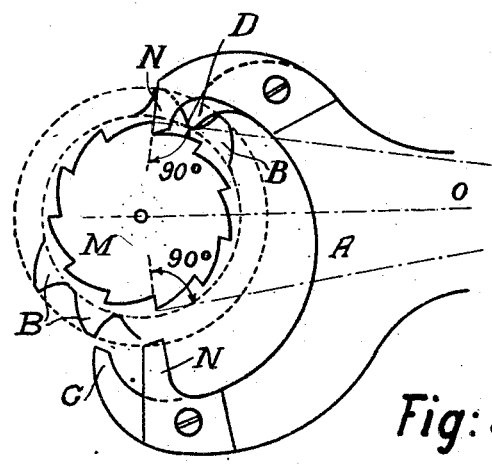
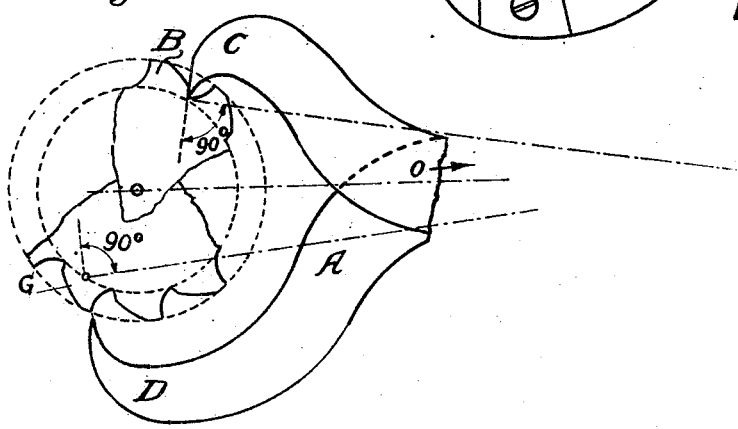
INVENTOR
Jean Abegglen
By D. Singer, atty.

Patented Apr. 5, 1932

1,852,992

UNITED STATES PATENT OFFICE

JEAN ABEGGLEN, OF NEUCHATEL, SWITZERLAND

MECHANICAL MOVEMENT

Application filed December 4, 1929. Serial No. 411,635.

My invention relates to mechanical movements more especially to double acting gears as commonly used in the weak current technical art and it is among the objects of my invention to provide an improved mechanical movement embodying a ratchet wheel and an actuating pawl lever of high capacity which is of simple, inexpensive and durable construction, and in which the ratchet wheel is given step-by-step rotation by oscillating movement of the pawl lever.

With the above and other objects in view, the invention consists in the construction, combination and arrangement of devices hereinafter described and claimed.

In the accompanying drawings constituting a part hereof and in which like reference characters designate like parts:

Fig. 1 is a side view of a double acting barring gear embodying the principle of my invention;

Fig. 2 illustrates a modified construction with two ratchets and two levers, and Fig. 3 is a further modification with one lever bearing two pawls on the end of each arm.

My invention as shown in Fig. 1 comprises in combination a lever A and a ratchet wheel B. One end of the lever A is pivotally connected to the pin O while the other end bears two pawl-ended arms C and D embracing the ratchet wheel B in such a manner that when one pawl D engages with one side of one of the teeth 1—11 of the ratchet B the other pawl C is moved out of contact with the corresponding side of another of the ratchet teeth. The sides E of the ratchet-teeth 1—11 are the sides which are engaged by the pawls and are formed relative to the shape of the pawls so that the angle of entrance $\gamma$ will increase at the entrance of a pawl, that is to say, the ratchet wheel will be fed forward for a constantly increasing angle while the engaged pawl A is moving toward the center of the ratchet wheel. $\gamma$ is the angle between the tangent to the way of the meshing pawl and the tangent to the respective ratchet tooth side E at every point of contact between said pawl and the respective ratchet tooth.

If for example the lever A (Fig. 1) by means of a suitable force is moved in the direction of the arrow P the lever will first be swung through the no-load angle $\alpha$ till the point $a$ of the pawl C engages the ratchet tooth 1 at $a^1$. In this moment the ratchet wheel B will be set in motion, in the direction indicated by the arrow X. The lever A will then be swung through the angle $\beta$ and the point $a$ of the pawl C arrives at $a''$. During this movement the point $c$ of the ratchet wheel B will be shifted forward to the point $a''$ so that the side $c, d$ of the tooth 11 will meet the side $a'', a'$ of the pawl C; the rotation of the ratchet B will then be interrupted. In this position the said ratchet has been shifted forward for one pitch being exactly equal to half a tooth. Synchronously to this movement the pawl D of the level A is brought from the point $b$ to the points $b^1$ and $b''$ and the tooth 6 into the position 6'.

The lever A is as already mentioned above locked as soon as the point $a$ of the pawl C strikes the point $c$ between the teeth 1 and 11; this enables the lever A to be returned into its initial position by means of a reaction force acting in the direction of the arrow P'. During this return-movement the lever A and the point $b''$ of the pawl D also swings through a no-load angle $\alpha'$ till the point $b''$ strikes the tooth 6 which during the first shifting period of the ratchet B has been moved from 6 to 6' at the point $b'$; in this moment the ratchet B again will be set in motion. The lever A then passes from the no-load angle $\alpha'$ over to the angle of operation $\beta'$ till the point $b''$ reaches the point $b$ at the bottom between the teeth 6 and 7. In this position the side $b^3$—$f$ of the tooth 5 strikes against the side $b$—$g$ of the pawl D; the movement of the ratchet B therefor will in this position also be locked in a very accurate manner.

As stated above the ratchet B will be shifted forward or turned in one direction for two pitches, that is, through an angle corresponding to the width of the base of for one of its teeth by every reciprocating motion of the lever A.

For the purpose of showing that a progressive movement of the ratchet is effected I have within the angle of operation $\beta'$ drawn two equi-angles $x$ and $y$. As soon as the point $b$ of the pawl D is shifted from the point $b'$ to the point $b^5$ the tooth 6' will advance from $h$ to $b^5$ and the ratchet B rotates in accordance to the small angle $s$; but when the pawl D is moved from $b^5$ to the point $b$ the ratchet B will pass the way $i$—$B^4$ in accordance to the angle $t$ this angle being far greater than the angle $s$. Thence follows that in spite of the angles of operation made by the lever A being equal to the angles of rotation made by the ratchet B differ from each other so that the latter are small at the initial velocity of the ratchet B and will be large as soon as the acceleration is arrived at.

The modification of my invention shown in Fig. 2 illustrates the theoretical form which may be applied for the ratchet teeth as well as for the sides of the pawls C and D. This theoretical form is especially determined for said modification and is adapted not only for the interior but also the exterior shifting action of the pawls, C, D. Fig. 2 also shows the curve of the backs of the teeth which favourably is formed so that even when the pawls quit the notches between the teeth the ratchet is enabled to rotate without any play between the back of the teeth and the respective pawl. This allows the leading of the ratchet and prevents the latter to be submitted to vibrations due to the force executed by the pressure of the lever A.

As in this modification the pawls show their exterior operation sides slightly differing in their form from the form of the interior operation sides it is necessary to arrange two ratchets B and G and two pawls C and D lying in two different planes corresponding to the position of one of the two ratchet wheels B and G and two levers A.

In the modification shown in Fig. 3 two ratchet wheels are used one of which executes the rotation the other the locking of the shaft common to both ratchets. This modification may be esteemed to be the theoretical best construction because the stoppage of the rotation is effected in an angle of exactly 90 degrees.

Each arm of the lever A has fastened to its end two pawls C, N and D, N which simultaneously mesh with the ratchet at the instant in which their arm strikes the respective tooth of the ratchet.

This meshing is effected in such a manner that the radial-tooth of the ratchet M strikes plainly against the stop-side of the pawls N of the lever A thereby locking the bodies in movement.

Having now particularly described my invention and in what manner it is to be performed what I claim as new, and desire to secure by Letters Patent, is:

1. A mechanical movement comprising a rotary ratchet wheel and an oscillatory lever, said lever having a pair of oppositely arranged pawls between which the said ratchet wheel is located, the cooperating sides of said pawls and ratchet wheel teeth being so formed as to cause the ratchet wheel to rotate with an angular velocity increasing during the entrance period of the pawl.

2. A mechanical movement comprising an oscillatory lever having a pair of oppositely arranged pawls and a rotary ratchet wheel arranged between the pawls of said lever for step-by-step rotation thereby, said ratchet wheel having teeth each presenting a convex front edge and a concave rear edge and the points of said pawls being so spaced apart and at such distances radially from the pivotal axis of the lever that each pawl during its movement toward the center of the ratchet wheel engages and exerts camming action on the concave edge of the opposing tooth and hence imparts a partial rotation to the wheel and on its movement outwardly from the center of the wheel clears the convex edge of the next succeeding tooth.

3. A mechanical movement comprising a rotary ratchet wheel and an oscillatory lever, said lever having a pair of oppositely arranged pawls between which the said ratchet wheel is located, said pawls being so arranged that during their movement one of them remains in contact with the teeth of said ratchet wheel and the teeth being so constructed that the angle of entrance formed by the path of either of the pawls in its movement toward the center of the ratchet wheel and the opposing side of the proximate tooth of the ratchet wheel is a different one for all points of contact along the said opposing toothed edge, to cause the ratchet wheel to rotate with an angular velocity increasing during the entrance period of the pawl.

In testimony whereof I affix my signature.

JEAN ABEGGLEN.